(12) United States Patent
Burns (10) Patent No.: US 7,523,692 B1
(45) Date of Patent: Apr. 28, 2009

(54) AIRCRAFT DEFENSE SYSTEM AGAINST MANPADS WITH IR/UV SEEKERS

(75) Inventor: Alan Alexander Burns, Portola Valley, CA (US)

(73) Assignee: MLHO, Inc., Portola Valley, CA (US)

( * ) Notice: Subject to any disclaimer, the term of this patent is extended or adjusted under 35 U.S.C. 154(b) by 0 days.

(21) Appl. No.: 11/982,579

(22) Filed: Nov. 2, 2007

Related U.S. Application Data

(60) Provisional application No. 60/919,169, filed on Mar. 21, 2007.

(51) Int. Cl.
*G01S 7/36* (2006.01)
*B64D 1/04* (2006.01)

(52) U.S. Cl. .............................. 89/1.1; 89/1.11; 342/14; 244/1 R; 244/121

(58) Field of Classification Search .................... 342/14; 244/121, 129.1, 1 R; 89/1.1, 1.11
See application file for complete search history.

(56) References Cited

U.S. PATENT DOCUMENTS 5,703,314 A * 12/1997 Meeker ....................... 89/1.11

2005/0006527 A1 * 1/2005 Conley ....................... 244/121
2007/0190368 A1 * 8/2007 Jung et al. .................. 428/919

* cited by examiner

*Primary Examiner*—J. Woodrow Eldred
(74) *Attorney, Agent, or Firm*—David E. Newhouse, Esq (57) ABSTRACT

An inexpensive, efficient and lightweight integrated small decoy system towed behind an aircraft to power an intense IR emitter for drawing in a missile with an IR sensitive guidance system away from vulnerable parts of a defended aircraft is combined with a system for simultaneously cloaking the aircraft with spectral bands of atmospherically scattered UV solar radiation reflected, and radiated from UV radiant sources mounted on the aircraft to defend against advanced MANPADS missiles with guidance systems sensitive to UV shadows cast by an aircraft in a background sky radiance of atmospherically scattered solar UV. Both the reflected and direct cloaking UV emittance may be spatially and/or temporally modulated to confuse an incoming missile. The UV aspect of this invention may also be combined with other C-MANPADS missiles, such as DIRCM, to provide additional defensive capability.

17 Claims, 10 Drawing Sheets

PRIOR ART

Fig. 1A

PRIOR ART

AIRCRAFT DEFENSE SYSTEM AGAINST MANPADS WITH IR/UV SEEKERS

CROSS-REFERENCES TO RELATED APPLICATIONS

This application claims the benefit of Disclosure Document 610137 titled "Counter-MANPADS Aircraft Defensive System" submitted 15 Dec. 2006 and of Provisional Patent Application 60/919,169 titled "Aircraft Defensive System Against MANPADS With IR/UV Seekers", filed 3 Mar. 2007. This application is related to provisional patent application 30/567,313, filed 30 Apr. 2004 and non-provisional patent application Ser. No. 11/089,694 titled "Self-Powered Tethered Decoy For Heat-Seeking Transport Aircraft Missile Defense" filed 25 Mar. 2005, now U.S. Pat. No. 7,028,947, issued 18 Apr. 2006.

STATEMENT REGARDING FEDERALLY SPONSORED RESEARCH AND DEVELOPMENT

There is and was no federally sponsored research and development.

BACKGROUND

1. Field of Invention

This invention relates to defending transport aircraft such as civilian airliners against attack by shoulder-fired missiles (MANPADS) employing combined infrared and ultraviolet sensitive seekers and IR-only seekers.

2. Introduction

Heat-seeking MANPADS (Man Portable Air Defense Systems) missiles such as the FIM-92 Stinger, shoulder launched anti-aircraft missile and various similar foreign versions (ref: "Raytheon Electronic Systems FIM-92 Stinger low-altitude surface-to-air missile system family", Jane's Land-Based Air Defence, Oct. 13, 2003, (See http://www.ianes.com/defence/air_forces/news/jlad/jlad001013__2_n.shtml) present a critical and pressing terrorist threat to commercial air transport aircraft. The most vulnerable phases of flight are during landing approach and immediately after takeoff. Many landing approach profiles require prolonged flight at low altitudes over populated areas. Nevertheless, although the stakes are high, the probability that any particular transport would ever be attacked is very low. For society, this situation produces a cost-effectiveness conundrum. A desirable missile defense system for transports must operate continuously, effectively, reliably, and economically.

Various systems have been proposed to defeat infrared (IR) missile threats. Pyrotechnic flares are traditionally used for this purpose, but have short effective time durations. Routinely dispensing flares to draw possible MANPADS missiles away from a transport is clearly unacceptable. Dispensing flares or recoverable decoys when an attack is detected requires a sophisticated and costly missile attack sensing system. Recurring false alarms would likely cause unacceptable hazards from flares to people and property.

Tethered decoys have also been proposed. Non-predeployed recoverable decoys must be deployed quickly after receiving a warning, which places stringent requirements on the tether line and requires a complex release and recovery systems. Decoys must also radiate considerable IR power, which limits operating duration or requires significant power-carrying capacity by the tether. Fuel burning decoys must be refueled and battery-operated decoys need to be recharged or replaced often, requiring costly and time-consuming ground operations. Other issue relate to handling potentially hazardous materials at passenger terminals.

Active jamming systems, including Directed Infrared Counter Measures (DIRCM), have also been strongly advocated. A typical proposed DIRCM system comprises three principal components: (1) a missile attack warning system; (2) data processing system; and, (3) a directed high-power laser in a gimbaled turret. At an estimated average cost of $1M or greater per aircraft, plus large recurring operating and maintenance costs, it would clearly be an extremely expensive proposition to outfit the entire 7000-aircraft US commercial transport fleet with active systems. The DIRCM system is more appropriate to larger aircraft, and produces severe cost performance penalties on smaller aircraft, such as the B-737 and Airbus-300 series, which make up the large majority of aircraft in the US fleet.

In short, an urgent need exists for an alternative cost-effective, long-term solution to the threat MANPADS missile systems to air transport aircraft fleets.

My invention comprises a non-consumable passive defense system that promises significantly lower initial and lifetime costs as well as effective protection against terrorist MANPADS attacks on commercial transport aircraft. The mere presence of such a system would likely dissuade attacks because the probability of a successful kill becomes very small while the probability of detecting the terrorists would be still significant. The simplicity and low cost of my system can lead to quick deployment throughout the commercial transport fleet and thus provide prompt defense and protection for our transport aircraft fleets an early date.

Newer generations of MANPADS shoulder launched missiles may employ imaging technologies to sense the contrast between sky background light or radiation and parts of an aircraft shaded particularly at shorter wavelengths, such as background UV. In particular, the lower surfaces of aircraft are shaded from both direct sunlight and from background sky brightness. Vertical surfaces of aircraft often have significant contrast from the sky background as well. As a counter, counter-measure, IR seeking missiles with such capability would veer into or toward darker sensed areas.

The present invention combines means for reducing or eliminating that UV contrast with IR counter-MANPADS methods, such as DIRCM, dispensed flares, and, in particular, towed decoys.

Initial MANPADS versions suffered from several problems, including locking on to bright IR sources, such as decoy flares and, notably, the sun. Later design generations incorporated a seeker or homing head that uses a dual IR and UV scanner. Two detector materials are used, one responsive to IR in the 3.5-5.0 micrometer wavelength band and the other responsive to UV in the 0.3-0.4 micrometer band (essentially the 0.32-0.4 micrometer "UVA" band). Such homing heads allow discrimination against background clutter and decoy flares, which appear as point sources of UV as well as of IR radiation. Sources that produce both UV and IR are ignored or severely down-weighted by the seeker sensor systems, preventing or reducing the likelihood that the missile will be attracted to them. More recent MANPADS improvements incorporate IR and UV focal plane array (FPA) sensors. Initial target acquisition and tracking are performed by IR seeker sensor systems. As the missile nears the intended target, perhaps 1 second (about 600 m) before impact, the seeker sensor system modifies the missile trajectory by biasing a steering signal toward UV-dark areas contrasting with the sky background.

Obviously, these newer MANPADS missile systems function more effectively in the daytime. At night, both the sky and the aircraft are dark and there is no contrast steering bias produced. During daylight hours a steering bias towards darker or shaded areas, in reality might be better described as a bias against brighter areas.

Countermeasures include reducing or reversing (making the shadowed parts of the aircraft brighter than the sky background) the UVA contrast between the shaded portions of the airframe. Zeroing or eliminating UVA contrast effectively cloaks the airframe. Reversing the contrast (making the airframe brighter) produces a steering bias away from the airframe. These countermeasures can be applied selectively to protect the more vulnerable parts of the airframe. Other potential countermeasure involves reducing the apparent visual size of the airframe in the UVA band by selectively illuminating shaded areas. This would delay activation of the UV target adaptive guidance (TAG) acquisition mode until it is too late to effectively steer the missile.

Although invisible to humans, the daylight sky is rather uniformly bright in the UVA band, even under overcast conditions due to scattering of UV photons by air molecules in the upper atmosphere. The overall indirect UVA sky radiation is approximately equal to direct UVA sunlight reaching the ground under clear sky conditions. Except within a relatively narrow ring around the sun, the UVA sky radiance is rather uniform across the sky hemisphere. The average UVA sky radiance does not depend strongly on the solar zenith angle. Under overcast conditions, even when the sun is completely obscured, lower, but nevertheless significant, numbers of UVA photons reach the surface via multiple scattering events within the clouds. The UVA sky radiance under overcast conditions is weaker and more uniform throughout the sky hemisphere than under a clear sky.

Under clear sky conditions, the average UVA sky radiance is typically about 2-3 $Wm^{-2}sr^{-1}$. Thus, to be invisible (i.e., zero contrast with the background sky) at UVA wavelengths, the shaded portion of an airframe would have to provide this level of artificial UVA radiance either by reflected or direct radiation. 3.4 $Wm^{-2}sr^{-1}$ corresponds to a radiant exitance of about 1 W per sq.ft. In this situation, cloaking 1000 sq.ft. of shaded aircraft surface would require less than 1 kW total illumination from an external UVA lamp.

Reflection from low clouds and the earth's surface can significantly reduce the UVA contrast between the sky and shaded aircraft surfaces and thus the required level of make-up radiance. The UVA albedo of the earth ranges from about 8% over forested areas to 90% or more over low clouds and ice- or snow covered regions. Over the latter regions the undersides of aircraft may be brighter than the sky background. Over forests, under clear skies, reflected direct solar and sky background illumination can reduce the required level of make-up radiation by 15%, somewhat reducing the required make-up radiant exitance over solidly forested and similar surfaces. Significant reductions in make-up radiant exitance requirements are expected over more general and varied surface types. Under overcast skies the required make-up radiant exitance will be significantly lower than this for all earth surface types.

The worst-case contrast between the sky and shaded aircraft surfaces occurs at high altitudes under clear skies over tropical forested regions within a ring close to the sun when it is directly overhead (zenith angle ~0°). The peak UVA sky radiance looking directly at the sun is an order of magnitude greater than the average radiance over the sky hemisphere. Even so, 75% of the sky hemisphere has a UVA radiance less than 3 $Wm^{-2}sr^{-1}$ for solar zenith angle greater than 20° and more than 90% of the sky is less than that for zenith angles greater than 30°. Over the continental US, the solar zenith angle is always greater than 25°. Lower solar zenith angles only occur in tropical areas near noon when the sun is directly overhead. However, it is very unlikely that a missile attack would be launched essentially vertically into the noonday sun at an aircraft more-or-less directly overhead. MANPADS missiles do not work well when fired at targets near the sun—if their seekers can acquire them at all. Early, IR-only MANPADS tended to lock on to the sun instead of an aircraft flying a transit momentarily occluding the sun. Later-generation models with seeker sensor systems strongly biased away from high UVA-radiance levels have mitigated such sun miscues. In addition, even at low approach speeds, a transport aircraft at an altitude corresponding to the maximum MANPADS operating range will transit, in just a few seconds, the bright UVA ring immediately surrounding the sun in the atmosphere. Therefore, practical levels of UVA radiation will effectively cloak and/or bias MANPADS missiles away from a targeted aircraft. It is not necessary to cloak, shaded aircraft surfaces from the higher UVA sky background levels surrounding the sun.

OTHER REFERENCES

Vol. 7. Countermeasure Systems, Pollock, David H., ed., 1993, pp. 242-245; The Infrared and Electro-Optical Systems Handbook, Infrared Research Analysis Center, Environmental Research Institute of Michigan, Ann Arbor, Mich., and SPIE Optical Engineering Press, Bellingham, Wash.

R. H. Grant[1], G. M. Heisler[2] and W. Gao[1]

Ultraviolet sky radiance distributions of translucent overcast skies Journal *Theoretical and Applied Climatology*

Publisher Springer Wien

ISSN 0177-798x(Print) 1434-4483 (Online)

Subject Earth and Environmental Science

Issue Volume 58, Numbers 3-4/September, 1997 http://www.springerlink.com/content/kl7k3m56qw336053/

Sky radiance distribution for ultraviolet and photosynthetically active radiation (http://shadow.agry.purdue.edu/research.model.skyrad.html)

Water Disinfection by Solar Radiation Assessment and Application, Chapter 4 "Solar Radiation", A. Acra, M. Jurdi, H. Mu'allem, Y. Karahagopian, and Z. Raffoul http://almashriq.hiof.no/lebanon/600/610/614/solar-water/idrc/

SUMMARY OF PRIOR ART

My U.S. Pat. No. 7,028,947, Burns discloses an airliner defense system utilizing self-powered, retrievable, towed decoys against MAPADS that provides both high IR power and a large IR radiating surface area. It is intended to decoy a missile drawing it away causing it to miss the aircraft, In order to mimic a jet engine, a decoy radiator must have similar irradiance spectrum and size as a jet engine, i.e., for a successfully missile spoof a, the IR radiator must produce a proper temperature in the appropriate radiation spectrum mimicking a jet engine as sensed by a seeking sensor head of an attacking missile. Sufficient energy is available from the air stream directed through a small decoy deployed and towed behind an aircraft to power a large and intense IR emitter during the vulnerable phases of flight. Unfurled IR radiator structures or "petals" present large area arrays of rear-facing IR emitters. During the high-altitude cruise phase the radiating petals furl down folding around the retrieved decoy body as it is stowed in a streamlined housing or within the body of the aircraft itself for minimizing fuel consumption and maneuverability penalties. Coverage in the forward direction may be provided by wavelength-selective reflection from the tail cone of the decoy or directly from radiators within the tail cone. A different IR spectrum may be required for forward IR radiation because the hot engine parts are likely to be shielded and only exhaust plumes may be "visible" to a MANPADS seeker head.

Traditional systems for heat-seeking missile defense commonly dispense flares or similar munitions as decoys. For example, U.S. Pat. No. 3,150,848 to Lager discloses energy-radiating masses comprised of metered pyrophoric and oxidizer substances ejected in pulses to decoy heat-seeking missiles. U.S. Pat. No. 4,498,392, Billard et al. teaches a chain of sequentially ejected pyrotechnic decoys. U.S. Pat. No. 5,074,216, Dunne et al discloses a stabilized infrared decoy flare designed to reduce tumbling and cooling after ejection into the airstream. U.S. Pat. No. 5,565,645, Tappan et al discloses a high-intensity infrared decoy flare that employs unstable combustion during the first 0.2-0.5 second after ejection and ignition. Initially, the peak intensity of the IR radiation emitted by the flare is said to be 826 watts/steradian. During later stable combustion the IR radiation is said to be 450 watts/steradian. None of these teach the use of UV radiation to change the UV contrast of a defended aircraft.

U.S. Pat. Nos. 6,663,049, Jakubowski et al and 6,352,031, Barbaccia describe radiative countermeasures using on-board fuel supplies. Neither Jakubowski or Barbaccia teaches the use of UV radiation to change the UV contrast of a defended aircraft.

Numerous disclosures teach tethered decoys and means for deploying and recovering tethered decoys. Examples include U.S. Pat. No. 5,136,295, Bull et al, U.S. Pat. No. 5,570,854, Brun, U.S. Pat. No. 6,683,555, Carlson et al, and Patent Application Publication US 2003/0071164, Carlson et al, U.S. Pat. No. 6,662,700, O'Neill describes a string of burning flares stored in a dispenser towed behind an aircraft along with a sensor to activate them when a threat is detected. None of these teach the use of UV radiation to change the UV contrast of a defended aircraft.

U.S. Pat. No. 5,497,156, Bushman discloses a towed target that collects and selectively reflects IR energy from the exhaust plume of a jet engine immediately ahead of the target in order to attract missiles. This is said to produce a greater heat signal that from the engine itself. Bushman does not teach the use of UV radiation to change the UV contrast of a defended aircraft.

U.S. Pat. No. 6,267,039, Czarnecki discloses an IR lamp mounted on a sacrificial portion of the aircraft structure itself. A missile attracted to the lamp will damage or destroy the sacrificial structure but hopefully not bring down the airplane. The lamp is powered directly by the aircraft. Czarnecki does not mention deploying the lamp away from the aircraft nor self-powering the IR lamp. Patent Application Publication US 2003/0116050, Brum et al, discloses an electrically heated radiation augmenter to attract heat-seeking missiles to a towed body. The augmenter is said to operate at 1400 F (1050K) emit 40 watts/steradian in the 3-5 micrometer band. The power source for the heater is not described but is said to be either internal or provided externally by means of the tow line. Brum et al do not disclose use of an internal or external turbine or generator or the use of UV radiation to change the UV contrast of the defended aircraft.

U.S. Pat. No. 5,333,814, Wallis teaches a maneuverable towed body for intercepting missiles. This body contains small IR emitters for attracting missiles and employs a propeller beyond the tail as a conventional ram air turbine (RAT) to power the body. Wallis does not teach unfurling IR radiators to increase the radiating surface area, deploying and recovering the decoy, storing the decoy in a low-drag configuration, or the use of UV radiation to change the UV contrast of the defended aircraft.

In Pub. No. US2006/0065774, Roques et al disclose an anti-aircraft protection device for an aircraft employing a towed and electrically powered IR-emitting conical decoy that would be deployed and recovered in a manner similar to that described in U.S. Pat. No. 7,028,947, Burns. However, Roques does not teach a self-powered decoy or unfurling IR radiating elements to increase the overall radiating area. Rather, the Roques decoy is powered through the tether, which requires it to carry considerable electrical power and greatly increases the weight of the tether. Roques et al do not teach the use of UV radiation to change the UV contrast of a defended aircraft.

SUMMARY OF THE INVENTION

My invention is a passive defense system that promises both low initial and lifetime costs and effective protection against terrorist MANPADS missile attacks on commercial transport aircraft. It is reusable for an unlimited number of times and neither requires hazardous consumables, nor emits hazardous waste. This system may be self-activating. The mere presence of such a system would likely dissuade attacks because probability of a successful kill becomes very small while the probability of detecting and concomitant cost to the terrorists would still be quite significant.

The invented system basically comprises one or more IR-emitting decoys that are deployed behind a transport aircraft combined with UV radiators and/or illuminators mounted in or on the skin of the aircraft.

The IR decoys are self-powered, extracting energy directly from the airstream and require no control or power from the aircraft. Energy extraction is accomplished using an internal high-speed turbine AC generator or alternator in the decoy. Potentially, considerable energy is available from the airstream behind transport aircraft. Even a relatively small and light decoy is capable of extracting considerable energy from the airflow and thus producing a very large IR signature. For example, the maximum drag power available by stopping a 15-in. diameter, 150-KIAS (Knots Indicated Airspeed) airflow completely is about 10 kilowatts. A typical transport approach speed is greater than about 150 KIAS. A significant fraction of this power level may be extracted in practice by an efficient turbine generator. This extracted electrical power is then converted to IR using a simple heater (or other means) and radiated as a copious amount of IR energy (100 s of watts/steradian), thus overwhelming the IR signature of the transport and attracting an attacking MANPADS missile. A 90% emissive Lambertian graybody at 1050K will radiate about 1 watt per sq. cm per steradian peaked near 2.8 micrometers wavelength. (The atmosphere is relatively transmissive in the 2.8-4.2 and 4.4-5.5 micrometer bands.) Unfurlable IR radiating elements provide a sufficiently great radiating area while allowing a small package when the decoy is stowed. A 1000 sq. cm. (about 150 square inches) heater at 1050K will emit about 1000 watts/steradian continuously and consume about 6000 watts of electrical power as a grey-body radiator. This area is approximately that of the hot part of a typical jet engine. Much of the extracted electrical power is supplied to the radiating elements wasted on radiation outside the desired 3-5 micrometer band. The effective radiation level may be increased dramatically by tailoring the emissivity versus wavelength profile of the radiators to reduce out-ofband radiation. [Please refer to my U.S. Pat. No. 7,028,947, hereby incorporated by reference into this application though fully set at length.]

UV radiators and/or illuminators mounted in or on the skin of the aircraft radiate in the UVA spectral band (0.3-0.4 micrometer band) to make-up a radiance deficit between shadowed portions of the aircraft and sky background radiance in UVA spectral band. Essentially, the UV radiators and/or illuminators in and on the aircraft skin supply replacement, or CLOAKING, UVA radiance eliminating contrast between the aircraft and the sky in the UVA spectral band. This replacement or additional UVA radiance can be indirect, diffusely reflected light provided by UVA lamps or other sources illuminating part or all of the potentially shadowed aircraft surfaces.

Alternatively, this replacement or cloaking radiance can be provided by direct radiation from a number of discrete UVA sources emplaced on or embedded in a shadowed region.

Less than 1 W/ft$^2$ average UVA radiant exitance is required to neutralize contrast between shadowed parts of an aircraft and the UVA sky background radiance under clear sky conditions that are most likely to be existing in MANPADS attack scenarios.

Heat-seeking missile seeker sensor heads, before launch, are typically designed to lock onto the most intensely IR radiating source proximate a line of sight intercepting a targeted, flying aircraft within range. One or more intensely IR radiating, self-powered towed decoy deployed from a protected aircraft shortly after liftoff, and/or during a descent land phase as the aircraft descends below a certain AGL (Above Ground Level) provide just such radiating sources. The IR decoy(s) are reeled in after the transport reaches a safe altitude and/or reaches a minimum AGL before touch down. The IR decoys may be deployed automatically in response to landing gear and flap settings.

The invented cloaking UVA radiation sources filling in for sky background are similarly activated simultaneously with IR decoy deployment. Such cloaking UV radiation systems may also be activated at other times as well, to afford protection, from possible UVA contrast seeking missile sensor systems at other AGLs. The invented cloaking UV radiation system is also appropriate for supplementing protection provided by other C-MANPADS defensive systems, including DIRCM and flares.

In a preferred embodiment, UVA sensors on unshadowed, and/or shadowed and unshadowed, parts of the airframe are employed to sense the intensity of the UVA sky background (and direct solar UVA). The sensor outputs are then used to adjust the intensity of the cloaking direct radiance and/or indirect radiant exitance provided by reflection from shaded parts of the aircraft in order to match the UV sky background behind a shaded part. Alternatively, the cloaking UV radiation may be adjusted to exceed the sky background, to levels comparable to direct (zenith) solar UVA radiance of the sun for effectively biasing a MANPADS seeker away from the target aircraft.

Alternatively, the cloaking UVA radiation may be modulated spatially or temporally in intensity, or by a combination of spatial and temporal intensity variation. In a further option, direct UVA lamps are placed on the trailing edges of the engine support pylons so that the combination comprising a lamp and hot engine mimic a pyrotechnic flare, biasing a MANPADS missile away from the aircraft jet engines and towards towed, intensely IR radiating decoys.

A further option is to incorporate a parachute system in the towed IR decoy so that it and the tether line can be safely jettisoned in case it cannot be reeled in. Yet another option is to mount a short-range radar proximity detector on the IR decoy to provide attack notification.

OBJECTS AND ADVANTAGES

Accordingly, objects and advantages of the present invention are:
  (a) to effectively protect civilian transport aircraft against surreptitious, MANPADS missiles attacks by terrorists;
  (b) to deter MANPADS missiles attacks against civilian transport aircraft;
  (c) to provide a cost-effective system for defending transport aircraft continuously against IR/UV missile attack;
  (d) to provide a compact and lightweight system for defending transport aircraft continuously against IR/UV missile attack;
  (e) to provide a long-term system for defending transport aircraft against heat-seeking missile attack;
  (f) to provide a system with low initial cost for defending transport aircraft against heat-seeking missile attack;
  (g) to provide an early-deployment system for defending transport aircraft against missile attack;
  (h) to provide a system for defending transport aircraft against heat-seeking missile attack that does not create hazards to people or structures on the ground;
  (i) to provide a system for defending transport aircraft against heat-seeking missile attack that requires no consumables;
  (j) to provide a system that requires no hazardous replenishment ground operations for defending transport aircraft against heat-seeking missile attack;
  (k) to provide a system that requires no refueling operations for defending transport aircraft against heat-seeking missile attack;
  (l) to provide a system for defending transport aircraft against heat-seeking missile attack that radiates sufficient IR energy to overwhelm that radiating from the transport aircraft for attracting attacking heat seeking missiles;
  (m) to provide a system for defending transport aircraft against heat-seeking missile attack that requires no additional electrical power from the transport aircraft for continuously radiating intense IR energy;
  (n) to provide a system for defending transport aircraft against heat-seeking missile attack that requires only a simple tether line that carries neither signals nor operating power;
  (o) to provide a MANPADS anti-missile system that is deployable immediately after takeoff for defending transport aircraft;
  (p) to provide a MANPADS anti-missile system that is deployable during approach to landing for defending transport aircraft;
  (q) to provide a system for defending transport aircraft against heat-seeking missile attack that can be reeled in and compactly folded during normal high-altitude flight regimes reducing parasitic drag;

Still further objects and advantages will become apparent from a consideration of the ensuing description and accompanying drawings.

| Reference Numerals In Drawings | |
|---|---|
| 2 | missile |
| 4 | transport aircraft |
| 6 | IR emitting decoy |
| 8 | tether |
| 9 | swivel |
| 10 | decoy body |
| 11 | air intake |
| 12 | IR radiator petals |
| 14 | tail cone |
| 16 | decoy housing pod |
| 18 | pod support pylon |
| 20 | aircraft skin |
| 21 | forward engine pylon |
| 22 | UV illuminator |
| 23 | wing |
| 24 | UV illuminator |
| 26 | UV illuminator |
| 28 | UV illuminator |
| 29 | horizontal stabilizer |
| 30 | UV illuminator |
| 31 | vertical stabilizer |
| 32 | UV illuminator |
| 34 | UV illuminator |
| 36 | UV illuminator |
| 38 | aft engine pylon |
| 40 | flap actuator fairing |
| 41 | UV illuminator |
| 42 | UV illuminator |
| 43 | engine nacelle |
| 44 | UV illuminator |
| 46 | UV discrete source array |
| 48 | UV source |
| 50 | engine pylon |
| 52 | jet exhaust nozzle |
| 54 | reflector fin |
| 56 | flush UV sources |
| 58 | reflector fin |
| 60 | flush UV sources |
| 62 | reflector fin |
| 64 | flush UV sources |
| 66 | aircraft skin surface |
| 68 | cover |
| 70 | reflecting facet support |
| 72 | facet |
| 74 | optional spacer |
| 76 | fin mounted source |
| 78 | fin mounted source |
| 80 | fin mounted source |
| 82 | support fin |
| 84 | housing |
| 86 | UV lamp |
| 88 | reflector |

DESCRIPTION

Preferred Embodiment

Figure 1A:
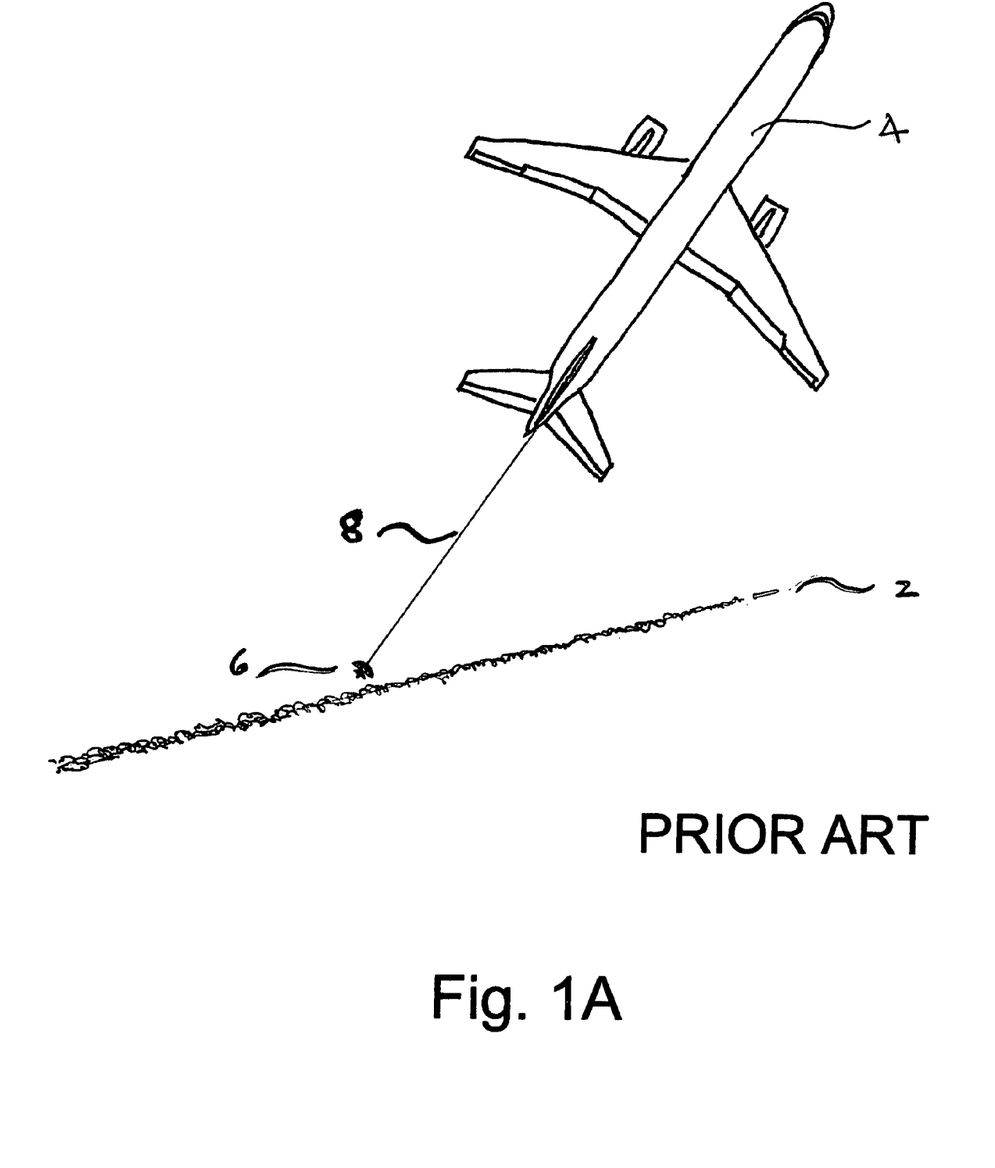
FIG. 1A depicts the prior art comprising a towed IR decoy behind an aircraft.
Figure 1B:
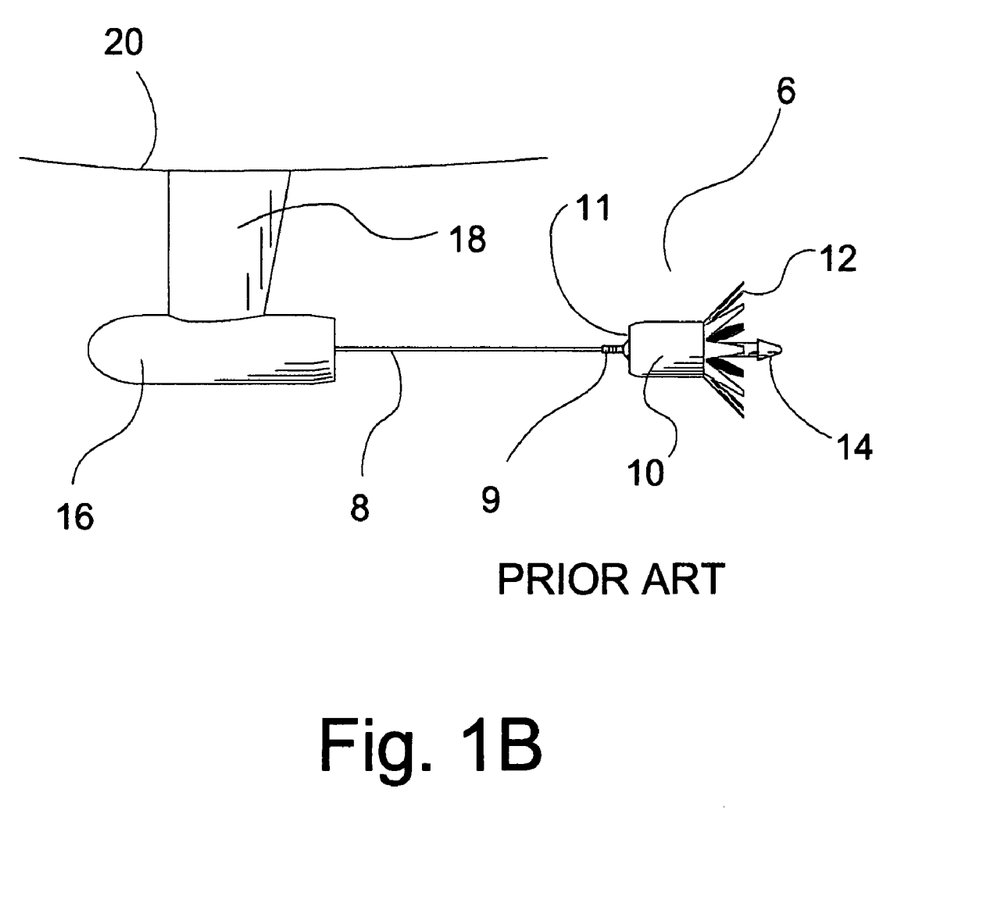
FIG. 1B shows a self-powered towed decoy with unfurled IR radiators.

Prior art. FIG. 1A and FIG. 1B depict the prior art. Looking first at FIG. 1A, infrared (IR) heat-seeking missile 2, which may be of the MANPADS variety, fired at transport aircraft 4, is attracted to self-powered IR-emitting decoy 6. Decoy 6 is towed behind aircraft 4 by means of tether 8. During high-altitude flight, including cruise, when aircraft 4 is beyond the operational range of missile 2, decoy 6 is retracted by means of tether 8 into a streamlined pod attached to aircraft 4. In the preferred mode, during takeoff decoy 6 is deployed from the pod immediately after aircraft lift-off and stowed when a safe altitude is reached. On approach to landing, decoy 6 is again deployed below a predetermined altitude and stowed shortly before touchdown.

FIG. 1B shows decoy 6 deployed from pod 16, which is attached to aircraft airframe element 20 by means of strut 18. Tether 8 is reeled in and out by means of a winching mechanism (not shown) within pod 16. Optional swivel 9 prevents tether 8 from twisting up. Tether 8 can optionally contain wire or fiber-optic data links. Alternatively, radio-frequency links may be employed to carry signal back and forth between aircraft 4 and decoy 6.

Principal features of decoy 6 include main decoy body housing 10, unfurling IR radiator 'petals' 12, and tail cone 14. When decoy 6 is stowed within pod 16 petals 12 fold down to form an overall streamlined body (not shown) comprising pod 16, petals 12, and tail cone 14. Alternatively, part of housing 10 may form part of the outer surface of the overall streamlined body. The primary purpose of radiating petals 12 is to increase the IR radiating area above that of the cross sectional area of housing 10. IR radiators, which may be simple electrically activated heaters or heating elements, are supported by and attached to the rearward facing surfaces of petals 12. For clarity, only one row of petals 12 is shown in FIG. 1B. Optionally, multiple rows of petals folding down over one another may be employed. Petals 12 are preferably aerodynamically shaped to minimize drag and cooling of the IR radiating surfaces. In further options, tail cone 14 may reflect IR radiation into the forward direction and/or support additional IR radiating elements on its surface.

Alternatively, decoy 6 may be partly or completely stowed inside aircraft 4 instead of within pod 16.

Several kilowatts of electrical power are required to radiate sufficient IR energy. As I explained in U.S. Pat. No. 7,028,947 such electrical power cannot be easily supplied from the towing aircraft, but could be provided means of an internal ram-air turbine (RAT) driving a convention electrical generators/alternators. The better alternative as I taught in the '947 patent is to combine the RAT and generator into one lightweight unit by employing turbine blades as generator pole pieces. This permits use of a lightweight tether that only carries signals though small wires or optical fibers.

As I explained in my '947 patent, ram air enters decoy 6 through intake port 11, is compressed in a nozzle where it passes through a turbine and is expanded into an exhaust port (not shown) between petals 12 and tail cone 14. A bypass port (not shown) may be provided to regulate the airflow and generator output.

In case of emergency, such as failure of the decoy to retract, the entire decoy system can be jettisoned by cutting the tether, preferably by means of a cutting mechanism (not shown) within pod 16. A small parachute (not shown) incorporated in body 10 is then deployed to slow the descent of the decoy and tether combination to a safe velocity. Preferably, the decoy would be jettisoned over a body of water or an uninhabited area, e.g., a uninhabited military reserve area.

PRESENT INVENTION

Figure 2:
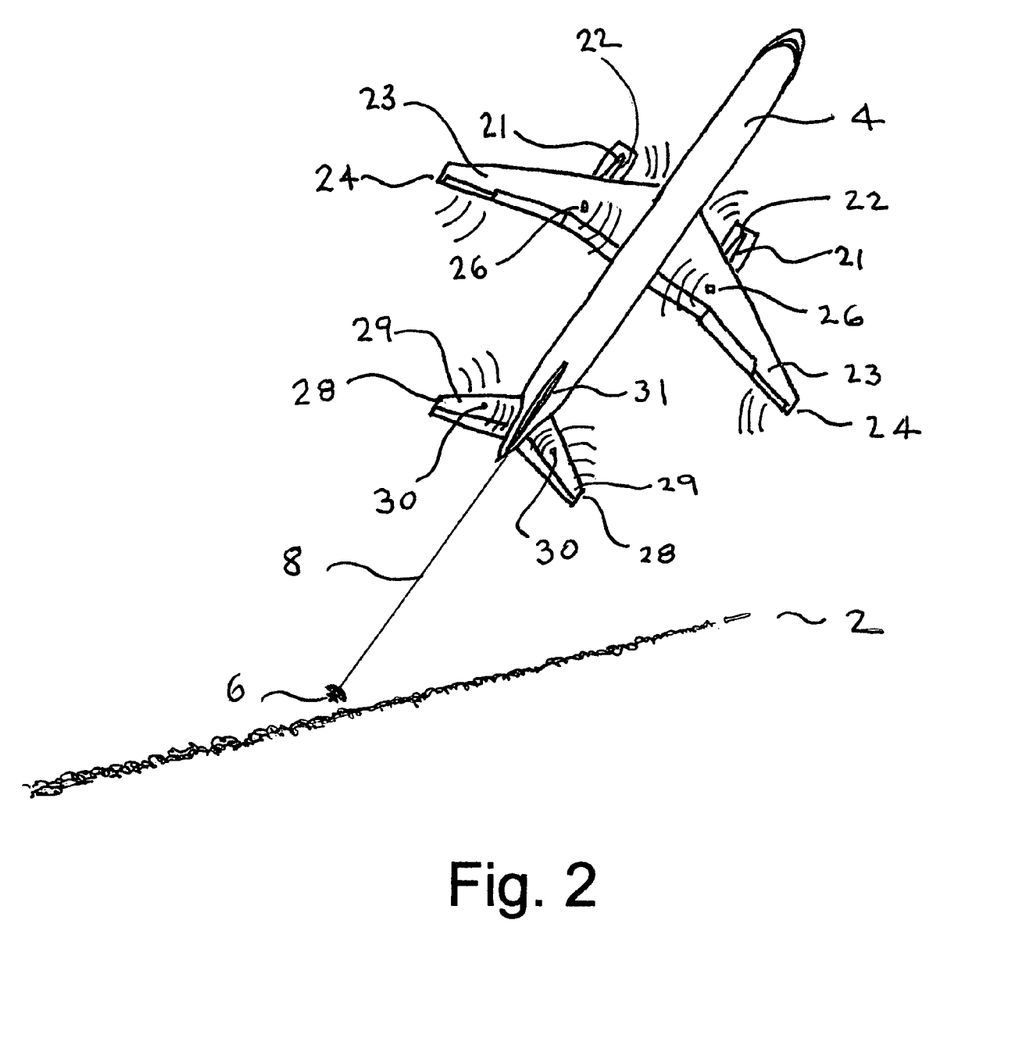
FIG. 2 shows a towed IR decoy behind an aircraft with UV illuminators.
Figure 3:
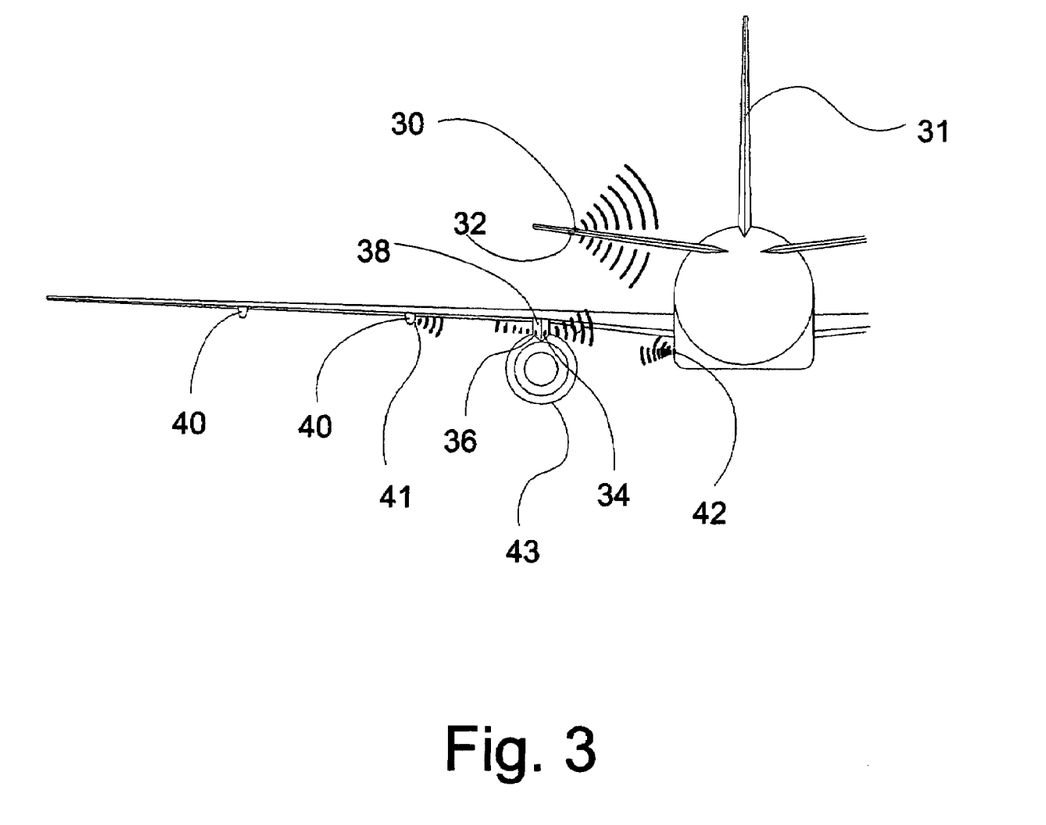
FIG. 3 illustrates various possible mounting locations for indirect UV illuminators.

Turning now to FIG. 2, the preferred embodiment of the present invention comprises a combination of the tethered IR emitting decoy of my U.S. Pat. No. 7,028,947 with added cloaking UV countermeasures against missiles incorporating a dual IR/UV contrast seeker sensor, missile guidance systems. The added UV countermeasure consists of UV sources 22, 24, 26, 28, and 30 illuminating various part of the skin of aircraft 4. UV radiation from these sources reflecting from the skin of aircraft 4 essentially makes-up deficit radiant exitance or emittance of UVA sky background radiance from the aircraft skin 20 eliminating contrast between the sky and the aircraft skin in UVA spectral bands, i.e. that in effect "cloaks" aircraft 4. Various types of UV sources that radiate UVA energy may be used as UV illuminators or lamps. These include so-called UV "blacklight" tubes, UV fluorescent bulbs and tubes, UV Light Emitting Diodes (LEDs) and clusters of UV tubes, bulbs and LEDs. UV sources 22-30 are preferably embedded in and flush with the skin 20 of aircraft 4. Flush mounting is desirable to eliminate adverse aerodynamic drag effects. As used in this application, "skin" refers to the exterior surfaces of structures making up the aircraft 4, including, without limitation, fuselage, wings, stabilizers, nacelles, and fairings. Alternatively, one or more sources 22-30 may be incorporated into protruding fairings, including existing fairings on aircraft 4. UV sources 22 are mounted within the forward parts of engine pylons 21, for illuminating a considerable extent of the fuselage of aircraft 4. UV sources 24 are mounted on the trailing tips of wings 23. UV sources 28 are located in the leading edges of the horizontal stabilizers 29. UV sources 26 are shown embedded in the wings and sources 28 are embedded in the upper surfaces of horizontal stabilizer 29. As shown in FIG. 3, UV sources 30 primarily illuminate the vertical stabilizer 31. Locations of UV sources 22-30 are intended to be illustrative of the possibilities. The skilled implementer should analyze the exterior configurations of the particular types or models of aircraft 4 and locate the various types of such illuminating UV sources for optimal radiant exitance or emittance in the UVA spectral bands from all areas the aircraft skin 20.

In FIG. 3 UV source 32 is shown embedded in the lower surface of the horizontal stabilizer for illuminating a portion of the aft fuselage. UV sources 34 and 36 are embedded in the aft part of engine pylon 38 for illuminating parts of the under wing and aft fuselage. Fairings 40 around the flap operating mechanism also afford good possible locations for embedded UV sources 41 for illuminating a portion of the engine nacelle 43. UV source 42 is embedded in the fuselage for also illuminating a portion of part engine nacelle 43 and a portion of the under wing area. Similarly, embedded UV sources 44 in FIG. 4 illuminate the lower surfaces of the horizontal stabilizer 29.

Optionally, direct UV radiators may be employed instead of indirect or reflected UV emittance of the aircraft skin. Direct UV radiators shine UV radiation outward from a defended aircraft 4 in high probability directions of possible incoming attack missiles. This arrangement is particularly useful for cloaking parts of an aircraft inaccessible to UV illumination by other sources.

Figure 4:
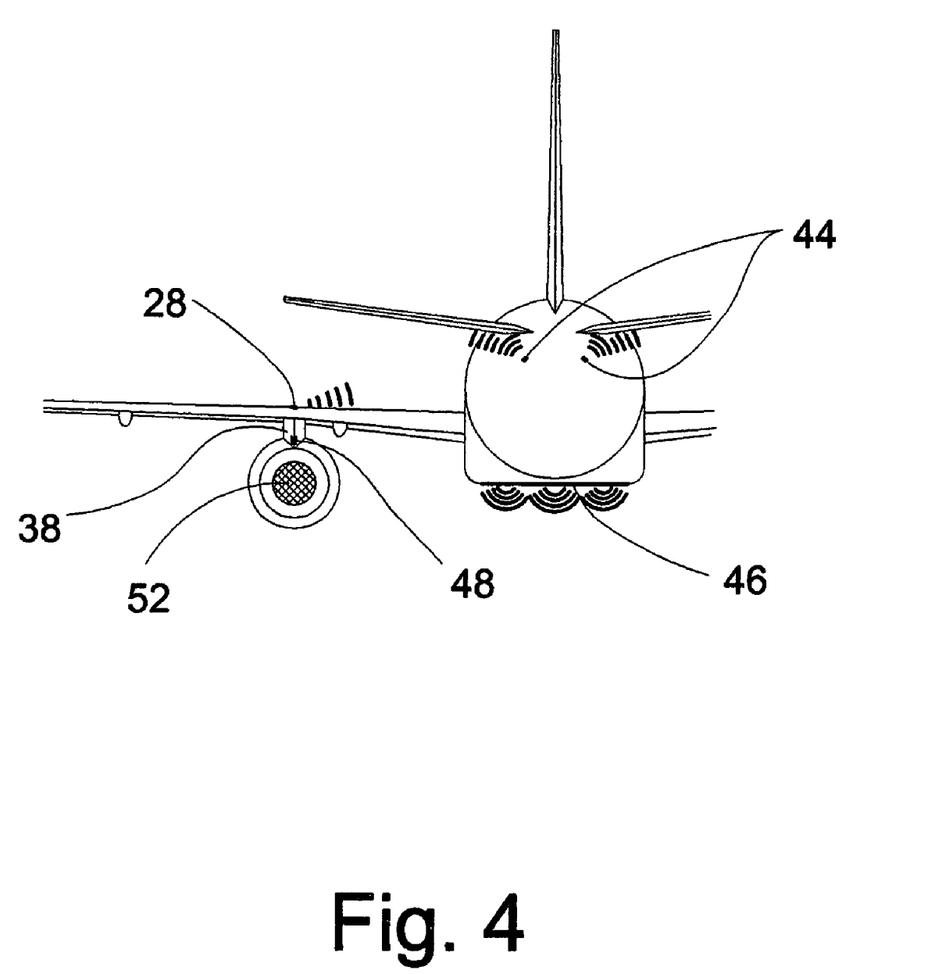
FIG. 4 illustrates additional possible mounting locations for indirect UV illuminators and for direct UV radiators.

FIG. 4 depicts an array 46 of discrete UV radiators embedded in the aircraft skin in the area into which the landing gear is retracted. Such discrete UV radiating arrays may be used in other parts of the aircraft. The spacing of such discrete radiators, which may be individually low-powered, is tailored by the angular resolving power of the seeker heads in representative attacking missile systems. In fact, a sufficiently dense spacing of discrete UV radiators may be sensed as a uniformly illuminated UVA sky background to an UV contrast seeker sensor system of an approaching missile.

More importantly, direct UV radiators or lamps may be used in certain locations to steer an attacking missile away from certain locations by taking advantage of missile's seeker sensor system built-in bias against UV sources. FIG. 4 shows just such a discrete UV radiator 48 mounted at the trailing edge of engine pylon 21 near a hot engine area 25. A dual-band IR/UV missile seeker guidance systems designed to not lock on the sun or flares, will similarly ignore IR emitters (the jet engines) associated with UV emissions provided by UV radiator 48.

Figure 5:
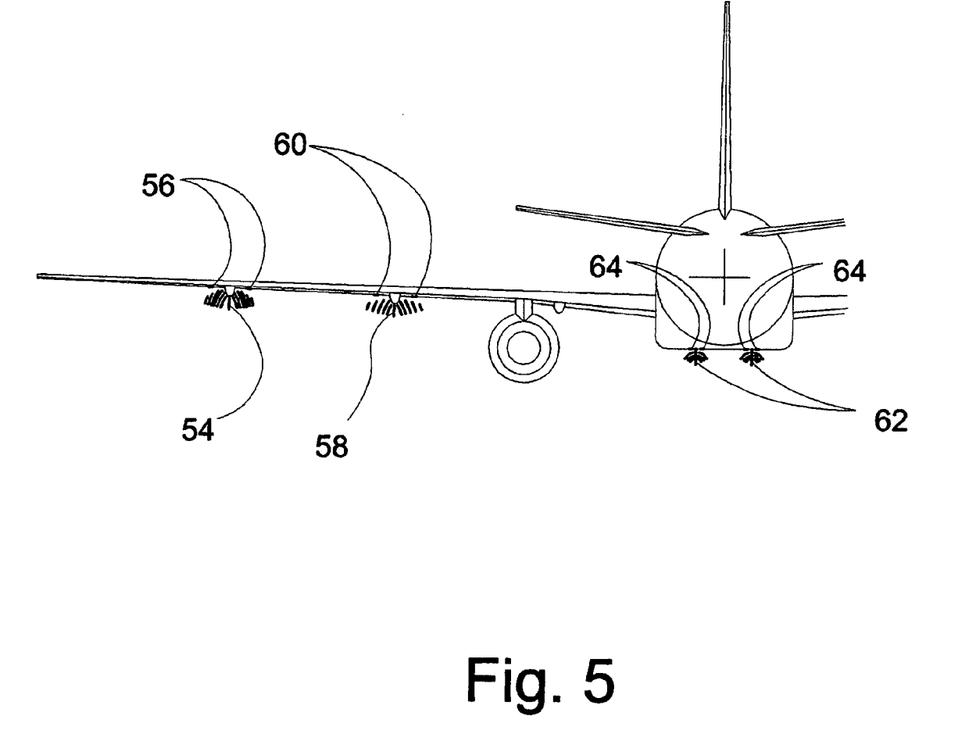
FIG. 5 illustrates further additional possible mounting locations for indirect UV illuminators comprising UV sources embedded flush with the skin of an aircraft or wing in conjunction with reflecting fins.

FIG. 5 shows possible locations for combinations of flush UV illuminators 56, 60, and 64 embedded in the aircraft skin 20 and protruding reflectors 54, 58, and 62. Reflectors 54 and 58 are mounted on the flap mechanism fairings to further increase their height above the aircraft skin surface and thus the range of illumination.

Figure 6:
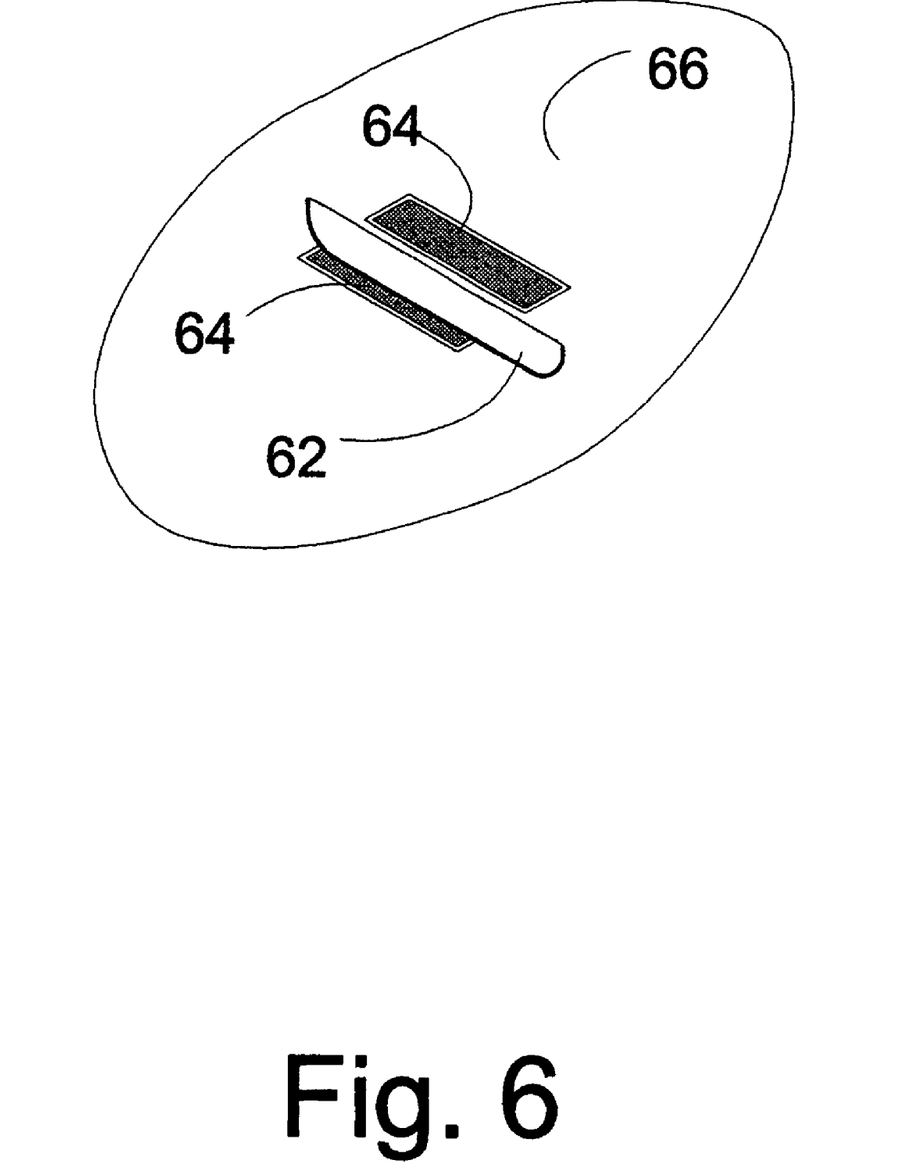
FIG. 6 depicts an indirect UV illuminator comprising flush mounted radiation sources and reflecting fins.

FIG. 6 shows source-reflector arrangement with a flush UV sources 64 flush with the aircraft skin surface 20 focused on reflecting fin 62, which is aligned with and elongated in the local air stream direction to minimize aerodynamic drag.

Figure 7:
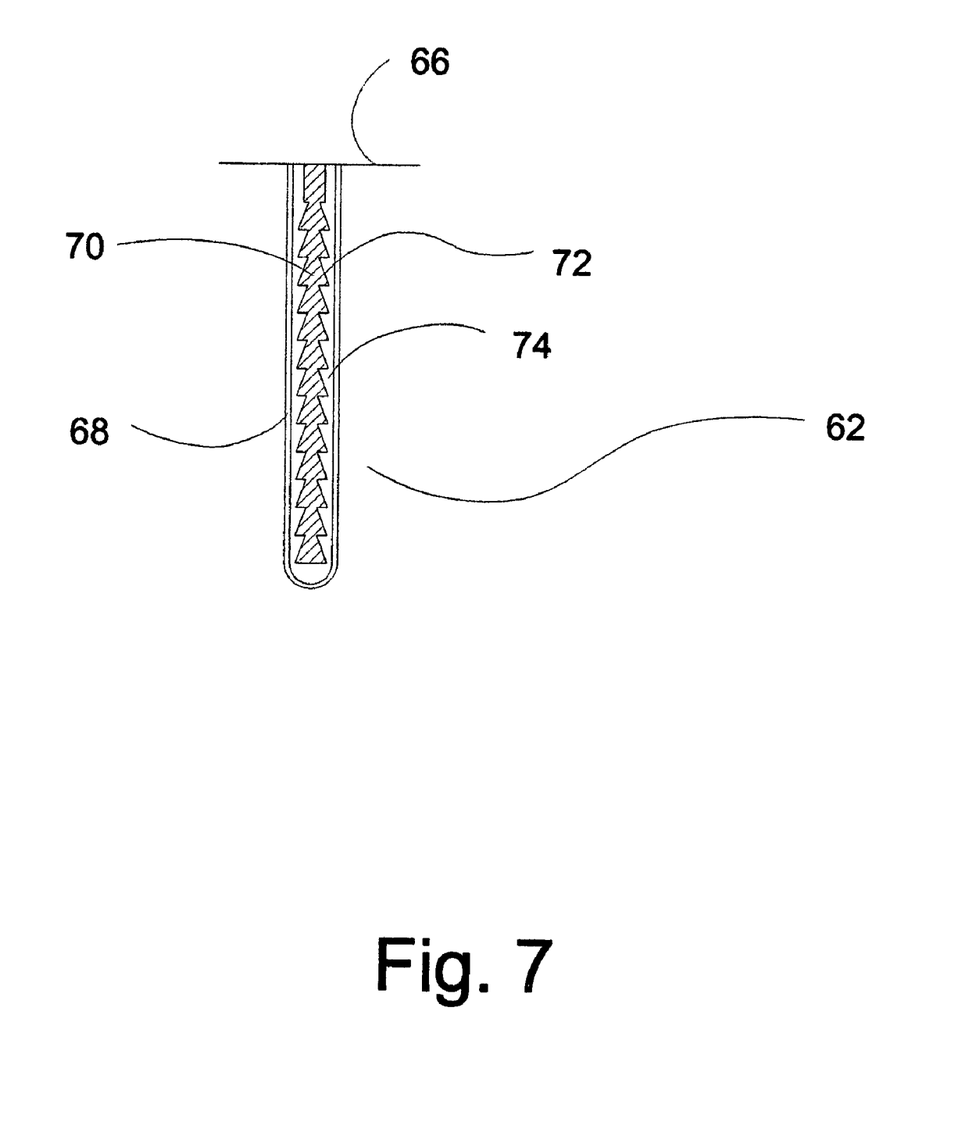
FIG. 7 is a cross-section of a reflecting fin.

FIG. 7 presents a possible cross-section for reflecting fin 62 showing a UV transparent housing 68, facet support 70, and optional spacer 72. Facets 72 are aligned in combination with the radiation patterns of sources 64 to direct UV radiation in desired directions for illuminating the aircraft skin 20. The extents and orientations of facets 72 may vary with location along fin 62.

Figure 8:
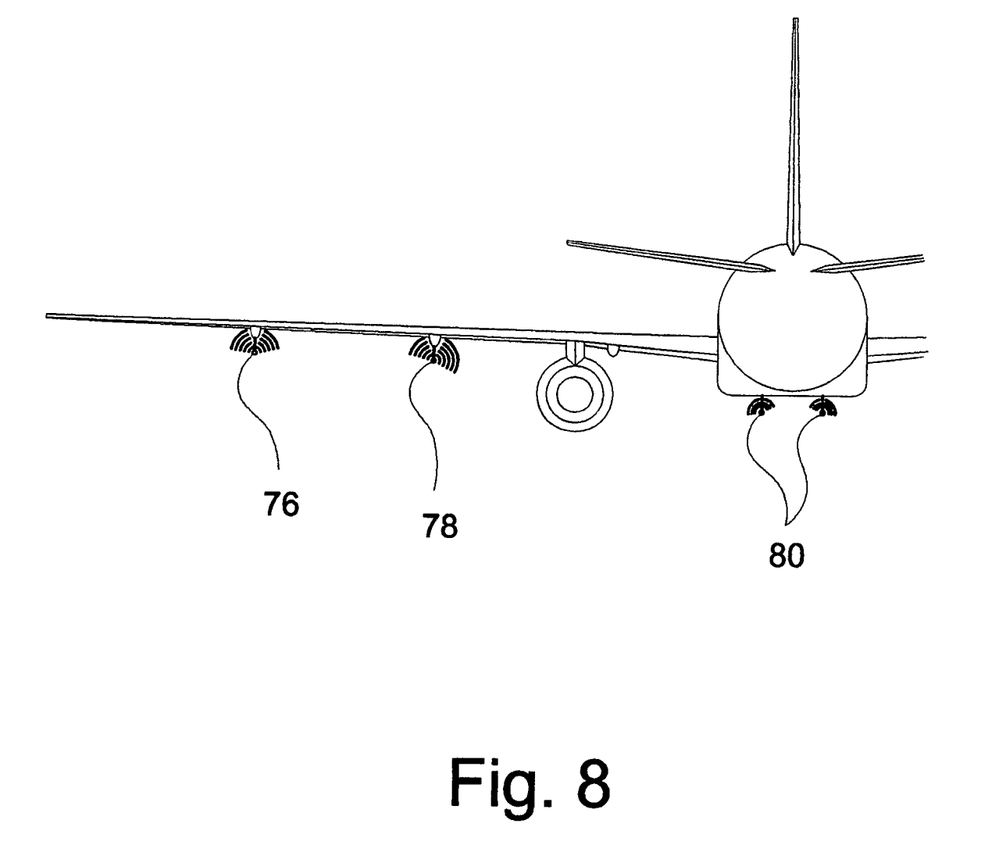
FIG. 8 illustrates various possible mounting locations for indirect UV illuminators employing fin mounted UV sources.
Figure 9:
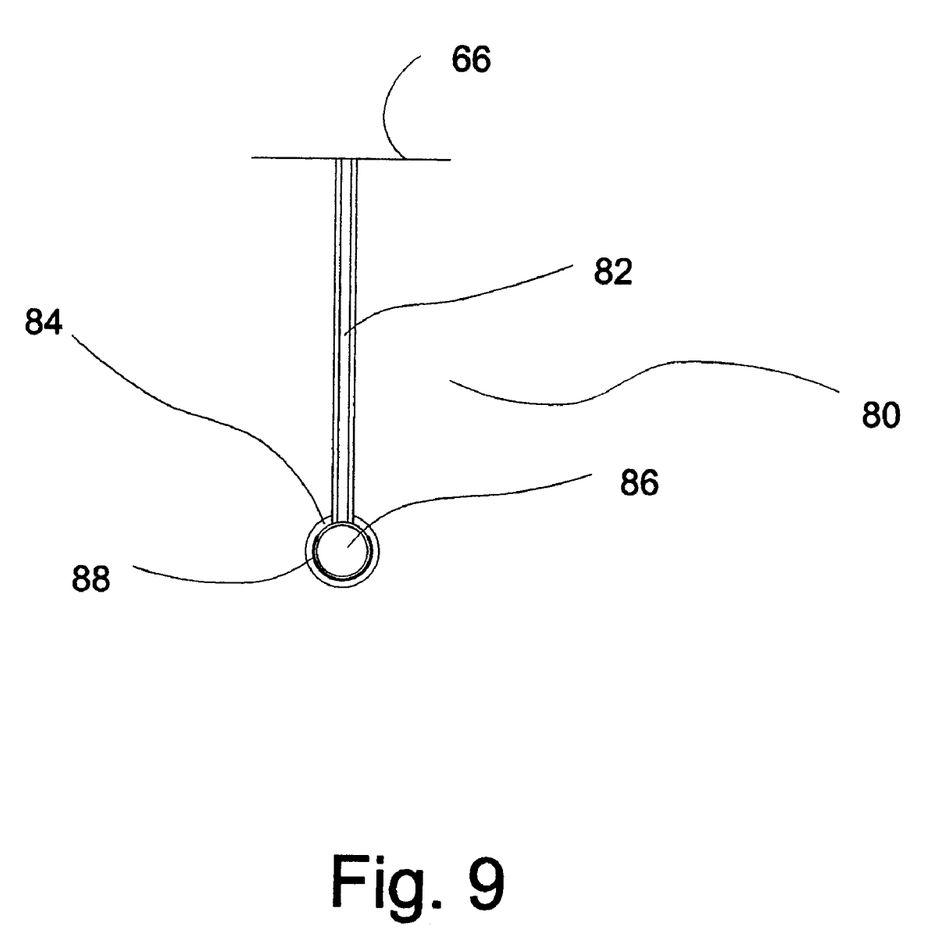
FIG. 9 is a cross section of a fin mounted UV source.

FIGS. 8 and 9 depict protruding UV illuminators 76, 78 and 80. FIG. 8 illustrates several locations with illuminators 76 and 78 mounted on flap operating mechanism fairings and illuminators 80 mounted directly on the underside surface of the aircraft. Illuminators 76, 78 and 80 are elongated along and aligned with the air stream much as reflector fin 62. FIG. 9 shows a cross-section of one possible protruding illuminator arrangement. Here, illuminator 80 comprises supporting fin 82, UV transparent housing 84, UV emitting lamp 86 and optional reflector 88. Reflector 88 serves to concentrate UV radiation towards the aircraft skin 20. Housing 84 may employ facets or lens elements to further direct and concentrate the UV illumination in desired directions.

In a further option, the strength or radiance ($W \cdot sr^{-1} \cdot m^{-2}$) of the cloaking or replacement UV radiation may be adjusted to that of background levels. Referring again to FIG. 2, UV sensors 90 are placed at various locations in or on the skin of aircraft 4 to measure the UV sky background radiance (strength) from various directions and any direct UV solar irradiance. The strengths of the replacement or cloaking radiation from the various UV illuminators and direct radiators are adjusted to match the UV sky radiance behind the illuminated part of the aircraft. Alternatively, the replacement UV illumination is adjusted to exceed the sky background to make some or all aircraft surfaces appear brighter than the background, which would bias attacking missiles with anti-sun lock-on sensors/guidance parameters away from those surfaces.

When adjusting cloaking UV radiation to that of the background levels, skilled implementers should bear in mind that radiant emittance ($watts/m^2$) from a surface is basically a product of the surface reflectance and the irradiance ($watts/m^2$) of an illuminating source. Accordingly, an aircraft skin with a high reflectance of UV in the UVA (scattered) spectral bands and/or peak (solar) spectral bands is preferred, but not absolutely necessary. In particular, a desired level of radiant emittance in the UVA bands from an aircraft skin can be achieved by treating/coating the aircraft skin to increase UVA reflectance, or by increasing the UVA irradiance of the illuminating sources, or by a combination of both.

Another option may be to modulate the cloaking or replacement UV radiation temporally, or spatially, or both over the surface of the aircraft. For, example, subsets or combinations of direct UV radiators and indirect UV illuminators radiating from different regions on the aircraft surface can be energized in random and/or fixed patterns, and at varying intensities that vary in time, to make it difficult, if not impossible for missile target sensor systems to timely acquire/recognize/differentiate and then maintain a lock on a cloaked aircraft, particularly in combination with a deployed, high irradiance IR decoy system that radiates in the primary target spectral band of the missile target guidance system.

In another option, the skin of defended aircraft 4 is treated, coated or painted to enhance its UVA diffuse reflectivity. Such treatment would be most effective on parts of the aircraft surface most likely to shade the sky background from a surface-launched missile. Conversely, it would be desirable to treat the upper surfaces of defended aircraft 4 with a low-reflectivity UVA paint or coating in order to reduce any direct solar UVA reflection and hence the contrast between shaded and illuminated areas of the aircraft skin.

Operation:

The UV cloaking or replacement radiation is activated when the IR decoy is deployed. It may also be activated for a longer period of time than that encompassing IR decoy deployment.

DESCRIPTION

Alternative Embodiments

In one alternative embodiment the UV cloaking or background replacement aspect of this invention is combined with a DIRCM installation. This provides protection against dual IR/UV missiles that leak past the DIRCM system, an important factor in the event of a simultaneous attack by multiple missile. The UV cloaking or replacement radiation would be activated responsive to a DIRCM sensed attack. Alternatively, the UV cloaking or replacement radiation would be activated routinely and continuously would be activated as for the preferred embodiment in conjunction with an IR emitting decoy when the defended aircraft is most vulnerable at lower altitudes during climb-out and approach-to-landing phases.

In another alternative embodiment the UV cloaking or background replacement aspect of this invention is combined with a flare dispensing system. This provides protection against dual IR/UV missiles that leak past the flares. The UV cloaking or replacement radiation is activated when flares are released and when the defended aircraft is most vulnerable at lower altitudes during climb-out and approach-to-landing phases as is the case of the preferred embodiment in combination with an IR emitting decoy.

In fact, UV cloaking or background replacement aspect of this invention can be stand-alone to provide protection against dual IR/UV missiles. In this case, the UV cloaking or replacement radiation would be activated routinely and continuously as with the preferred embodiment when the defended aircraft is most vulnerable at lower altitudes during climb-out and approach-to-landing phases.

CONCLUSIONS, RAMIFICATIONS, AND SCOPE

Accordingly, it can be seen that I have provided a method and apparatus for economically defending transport aircraft against attack by a missile with a combined IR and UV seeker head or a missile having only IR capability.

The description above contains many specificities, including but limited to probable electromagnetic spectral bands necessary for of the decoying and cloaking aircraft for spoofing attacking missile guidance systems dependant on such radiation for locating a target. These expressed limitations should not be construed as limiting but rather as teachings and suggestions to motivate skilled implementers to seek out and take advantage the blindness of missile guidance systems using simple, inexpensive, easily implemented, protective measures. The need for, and possible ramifications of anti-missile spoofing and cloaking protection for transport aircraft cannot be minimized.

Keeping the above admonition in mind, the scope of the present invention should be determined by the appended claims and their equivalents, rather than by the examples given.

I claim:

1. A method for cloaking an aircraft flying during daytime through the atmosphere, the steps comprising:
    a) locating electromagnetic radiation sources at various positions on exterior surfaces of an aircraft structure that radiate in at least one particular spectral band of solar radiation scattered in the atmosphere;
    b) treating the exterior surfaces of the aircraft structure to reflect electromagnetic radiation at the particular spectral bands radiated by the radiation sources;
    c) irradiating selected exterior surfaces of the aircraft with radiation from the variously located electromagnetic radiation sources during selected portions of a flight of the aircraft.

2. The method of claim 1 wherein the treatment is coating.

3. The method of claim 2 wherein the coating treatment is paint.

4. The method of claim 1 wherein the variously located radiation sources radiate in particular UVA radiation spectral bands having wavelengths ranging between 300 nm and 400 nm that are scattered in the atmosphere.

5. The method of claim 1 wherein the variously located radiation sources radiate in the particular spectral bands with sufficient radiant flux for inducing radiance from the selected irradiated exterior surfaces of the aircraft comparable to sky background radiance in the particular spectral bands, whereby, the selected irradiated surfaces are sensed as having a radiance essentially equivalent to sky background radiance in those particular spectral bands.

6. The method of claim 1 and further including steps of:
    d) locating arrays of radiation sources at selected locations on the aircraft structure that are occluded in part, by structural features of the aircraft flying at usual attitudes from direct irradiation by sky background radiation for radiating outward from the aircraft and for irradiating surrounding surfaces of the aircraft structure in particular spectral bands of solar radiation scattered in the atmosphere; and
    e) energizing selected arrays of radiation sources to radiate during selected portions of a flight of the aircraft.

7. The method of claim 6 wherein the selected, energized arrays of radiating radiation sources provide an average radiance from the selected locations on the aircraft structure at least comparable to anticipated radiance of daytime background sky radiation in the particular spectral bands.

8. A method for cloaking an aircraft flying during daytime through the atmosphere, the steps comprising:
   a) locating arrays of electromagnetic radiation sources at selected locations on the exterior of an aircraft structure for radiating from the aircraft and irradiating surrounding surfaces of the aircraft structure in at least one spectral band of sky background radiation that are occluded in part by structural features of the aircraft flying at usual attitudes from direct irradiation by sky background radiation;
   b) treating exterior surface regions of the aircraft structure to enhance reflection of radiation in the particular spectral bands radiated by the radiation sources;
   c) energizing selected arrays of radiation sources for radiating electromagnetic energy in the particular spectral bands outward from the aircraft and for irradiating surrounding treated exterior surface regions of the aircraft structure for reflecting that radiation during selected portions of a flight of the aircraft.

9. The method of claim 8 wherein selected arrays of radiation sources radiate electromagnetic radiation having a radiance at least comparable to anticipated daytime sky background radiation radiance in the particular spectral bands.

10. The method of claim 8 wherein selected arrays of radiation sources radiate in particular UVA solar spectral bands having wavelengths ranging between 400 nm and 300 nm scattered by the atmosphere.

11. The method of claim 1 or 8 and further including the step of providing the aircraft with a defensive system against heat-seeking missiles.

12. The method of claim 11 wherein the defensive system is a towed IR-emitting decoy.

13. The method of claim 11 wherein the defensive system is a directed infrared laser.

14. The method of claim 11 wherein the defensive system comprises flares.

15. The method of claim 12 wherein the decoy is self-powered.

16. The method of claim 11 wherein the variously located radiation sources are energized to radiate in the particular spectral bands and the defensive system against heat-seeking missiles is deployed during takeoff and landing approach phases during a flight the flying aircraft.

17. The method of claim 1 or 8 and further including the step of:
   (i) modulating the intensities of the radiation emitted by selected arrays of electromagnetic radiation sources during selected portions of a flight of the aircraft.

* * * * *